US012291216B2

United States Patent
Okada et al.

(10) Patent No.: US 12,291,216 B2
(45) Date of Patent: May 6, 2025

(54) VEHICLE CONTROL DEVICE

(71) Applicant: SUBARU CORPORATION, Tokyo (JP)

(72) Inventors: Osamu Okada, Tokyo (JP); Tatsuya Suto, Tokyo (JP); Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 363 days.

(21) Appl. No.: 17/464,984

(22) Filed: Sep. 2, 2021

(65) Prior Publication Data

US 2022/0063640 A1  Mar. 3, 2022

(30) Foreign Application Priority Data

Sep. 2, 2020 (JP) .................................. 2020-147844

(51) Int. Cl.
*B60W 50/00* (2006.01)
*B60W 40/076* (2012.01)
(Continued)

(52) U.S. Cl.
CPC ...... *B60W 50/0098* (2013.01); *B60W 40/076* (2013.01); *B60W 50/14* (2013.01);
(Continued)

(58) Field of Classification Search
CPC ........... B60W 50/0098; B60W 40/076; B60W 50/14; B60W 2050/0054;
(Continued)

(56) References Cited

U.S. PATENT DOCUMENTS 10,495,458 B2 * 12/2019 Kubota ..................... B60R 1/27
10,793,070 B2 * 10/2020 Watanabe ................ H04N 7/18
(Continued)

FOREIGN PATENT DOCUMENTS

JP   2016-084089 A   5/2016
JP   2018-001901 A   1/2018
JP   2019-038372 A   3/2019

OTHER PUBLICATIONS

Office Action dated on Apr. 23, 2024 issued in the corresponding Japanese Patent Application No. 2020-147844, w/ English Translation.

*Primary Examiner* — Bhavesh V Amin
(74) *Attorney, Agent, or Firm* — Rimon P.C.

(57) ABSTRACT

A vehicle control device is configured to issue a command to change at least a behavior of a vehicle in accordance with a change in a driving situation of the vehicle, and includes a vehicle condition detection device, an image capture device, a display device, and an arithmetic control device. The vehicle condition detection device is a slope angle detection sensor to measure a slope angle of a road surface on which the vehicle is driving. The image capture device is configured to capture an image of an area ahead of the vehicle. The display device is configured to display an image in a vehicle compartment of the vehicle. The arithmetic control device is configured to display the image of the area ahead of the vehicle on the display device when an amount of change in the slope angle measured by the vehicle condition detection device exceeds a predetermined threshold.

1 Claim, 5 Drawing Sheets

(51) Int. Cl.
  *B60W 50/14* (2020.01)
  *G06V 20/56* (2022.01)
(52) U.S. Cl.
  CPC ... *G06V 20/588* (2022.01); *B60W 2050/0054* (2013.01); *B60W 2050/146* (2013.01); *B60W 2520/26* (2013.01); *B60W 2552/15* (2020.02)
(58) Field of Classification Search
  CPC ....... B60W 2050/146; B60W 2520/26; B60W 2552/15; G06V 20/588; G06V 20/56
  See application file for complete search history.

(56) References Cited

U.S. PATENT DOCUMENTS

| | | | |
|---|---|---|---|
| 10,821,968 B2 * | 11/2020 | Cho | B60W 10/18 |
| 2011/0137513 A1 * | 6/2011 | Watanabe | B60W 30/045 |
| | | | 701/31.4 |
| 2013/0204455 A1 * | 8/2013 | Chia | G07C 5/0858 |
| | | | 701/1 |
| 2014/0063197 A1 * | 3/2014 | Yamamoto | G06T 11/001 |
| | | | 348/46 |
| 2015/0131864 A1 * | 5/2015 | Driscoll | G06V 20/56 |
| | | | 382/104 |
| 2016/0059700 A1 * | 3/2016 | Watanabe | H04N 23/634 |
| | | | 348/333.02 |
| 2016/0114727 A1 * | 4/2016 | Watanabe | B60R 1/24 |
| | | | 348/118 |
| 2016/0182863 A1 * | 6/2016 | Watanabe | B60R 1/28 |
| | | | 348/148 |
| 2018/0001887 A1 * | 1/2018 | Watanabe | B60W 30/025 |
| 2018/0297520 A1 * | 10/2018 | Morimura | B60Q 9/008 |
| 2018/0362085 A1 * | 12/2018 | Shichino | H04N 23/63 |
| 2019/0163988 A1 * | 5/2019 | Watanabe | B60R 11/04 |
| 2021/0214922 A1 * | 7/2021 | Yamashita | G01B 11/24 |
| 2022/0063640 A1 * | 3/2022 | Okada | G06V 20/56 |

\* cited by examiner

VEHICLE CONTROL DEVICE

CROSS-REFERENCE TO RELATED APPLICATIONS

The present application claims priority from Japanese Patent Application No. 2020-147844 filed on Sep. 2, 2020, the entire contents of which are hereby incorporated by reference.

BACKGROUND

The disclosure relates to a vehicle control device and more particularly to a vehicle control device configured to change a driving safety related behavior of a vehicle.

In recent years, various observation support devices have been developed to give a broader observable view to a person driving a vehicle (for example, Japanese Unexamined Patent Application Publication No. 2019-038372).

One example of such observation support devices is a front view monitor. A front view monitor is configured to display, on a center display in the vehicle compartment of the vehicle, an image captured by a front camera attached to the front end surface of the vehicle. As a result of this, the person can see blind spots in front or in front and to the sides of the vehicle by using the center display and thus safety can be improved while the vehicle is driving.

Furthermore, in recent years, various devices have been developed that are configured to change a driving safety related behavior of a vehicle in accordance with a driving situation of the vehicle.

SUMMARY

An aspect of the disclosure provides a vehicle control device configured to issue a command to change at least a behavior of a vehicle in accordance with a change in a driving situation of the vehicle. The vehicle control device includes a vehicle condition detection device, an image capture device, a display device, and an arithmetic control device. The vehicle condition detection device is a slope angle detection sensor and configured to measure a slope angle of a road surface on which the vehicle is driving. The image capture device is configured to capture an image of an area ahead of the vehicle. The display device is configured to display an image in a vehicle compartment of the vehicle. The arithmetic control device is configured to display the image of the area ahead of the vehicle on the display device when an amount of change in the slope angle measured by the vehicle condition detection device exceeds a predetermined threshold.

An aspect of the disclosure provides a vehicle control device configured to issue a command to change at least a behavior of a vehicle in accordance with a change in a driving situation of the vehicle. The vehicle control device includes a vehicle condition detection device, a recognition device, a display device, and an arithmetic control device. The vehicle condition detection device is a ground contact detection sensor and configured to measure a ground contact state between the wheel of the vehicle and a road surface. The recognition device is configured to recognize the wheel of the vehicle or a vicinity of the wheel. The display device is configured to display an image in a vehicle compartment of the vehicle. The arithmetic control device is configured to display the image of the wheel or the vicinity of the wheel on the display device when an amount of change in the ground contact state exceeds a predetermined threshold.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Regarding the front view monitor described above, the driver or a passenger is to perform an invoking operation such as pressing of a button in the vehicle compartment of the vehicle to start up the front view monitor, and thus there is a possibility that it is complicated to start up the front view monitor. Moreover, in a case where blind spots in front or in front and to the sides of the vehicle are to be immediately, visually checked, there is a possibility that it is difficult to perform an operation for starting up the front view monitor in time.

Vehicle constituent devices other than the front view monitor have substantially the same possibilities as those above. There is a possibility that it is difficult to instantly change a driving safety related behavior of the vehicle in a case where a safety related situation has changed while the vehicle is driving.

It is desirable to provide a vehicle control device that can easily change a driving safety related behavior of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
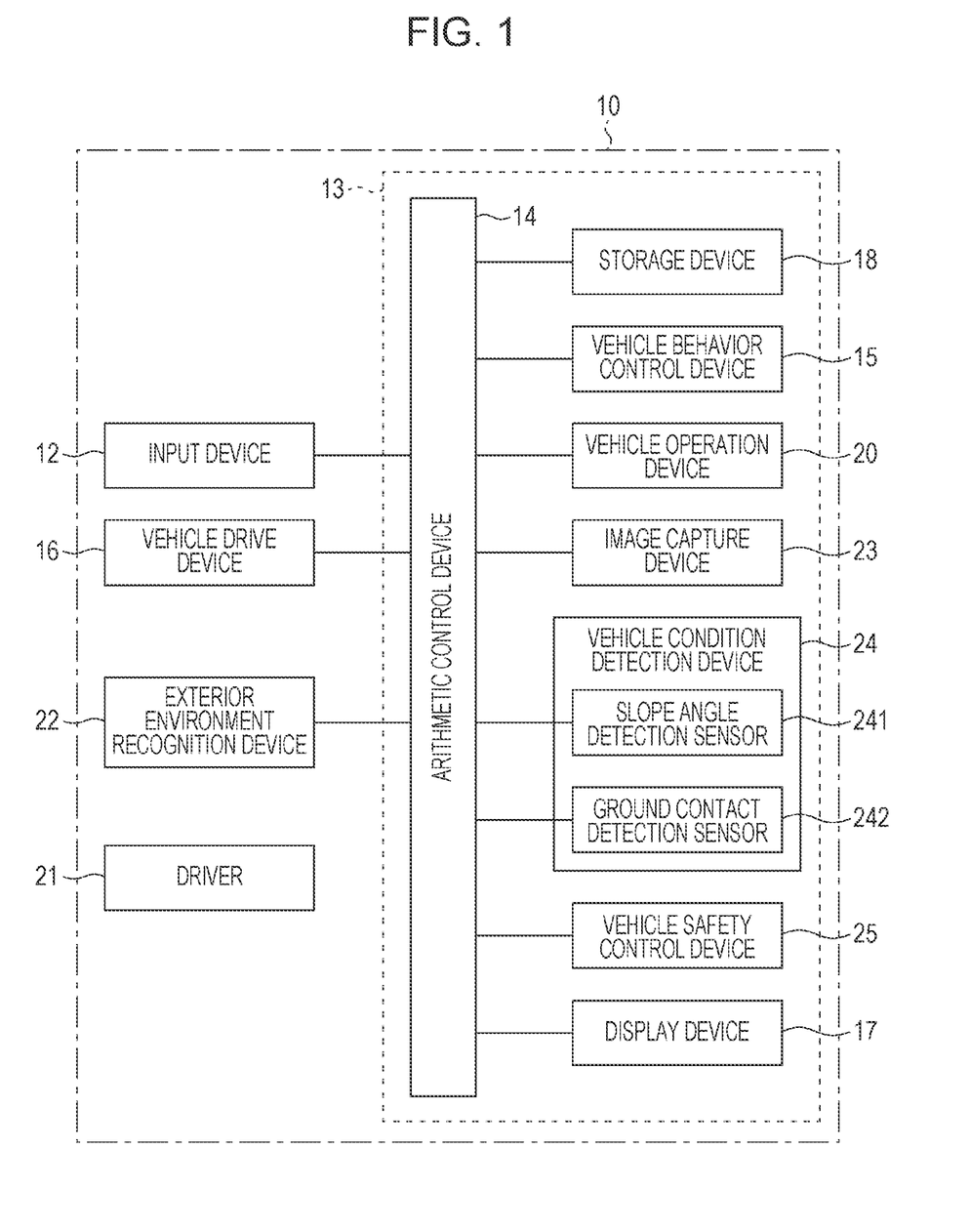
FIG. 1 is a block diagram illustrating a connection configuration of a vehicle provided with a vehicle control device according to an embodiment of the disclosure.

FIG. 1 is a block diagram illustrating a connection configuration of a vehicle 10 provided with a vehicle control device 13. Note that, in the following description, up-down, front-rear, and left-right directions are used. Left and right correspond to left and right when the vehicle 10 is viewed from the front.

With reference to FIG. 1, the vehicle 10 mainly has an arithmetic control device 14, an input device 12, a vehicle drive device 16, an exterior environment recognition device 22, a storage device 18, a vehicle behavior control device 15, a vehicle operation device 20, an image capture device 23, a vehicle condition detection device 24, a vehicle safety control device 25, and a display device 17.

The arithmetic control device 14 is a controller of the vehicle 10 and is, for example, an electronic control unit (ECU) including an arithmetic unit configured to perform various arithmetic operations or the like. The arithmetic control device 14 executes predetermined arithmetic processing for the vehicle 10 to drive, on the basis of input information or the like input from, for example, the input device 12. The arithmetic control device 14 also executes predetermined arithmetic processing to operate the vehicle control device 13. In one example, when the vehicle 10 is driving, the arithmetic control device 14 determines whether, for example, the amount of change in at least one of a road surface situation, a vehicle situation, or a ground contact state has changed by a predetermined amount or more, that is, whether the amount of change has changed and exceeded a predetermined threshold. In a case where it is determined that the amount of change in either one out of the situations and the state has changed by the predetermined amount or more, the arithmetic control device 14 changes at least one of a display on the display device 17 or a behavior (drive, make a turn, stop) related to the safety and driving performance of the vehicle 10. These things will be described later with reference to, for example, FIG. 3.

The input device 12 includes switches such as buttons or a touch screen operable by a driver 21. By operating the input device 12, the driver 21 can issue a start command and an end command for various functions of the vehicle 10.

The vehicle drive device 16 includes a power source such as an engine or a motor for causing the vehicle 10 to drive, a braking device, and a steering apparatus. The vehicle drive device 16 accelerates, decelerates, and steers the vehicle 10 in accordance with the amount of operation performed on the vehicle operation device 20 by the driver 21.

The exterior environment recognition device 22 is a device configured to recognize the environment outside the vehicle 10 and is, for example, an image sensor configured to capture an image of an area ahead of the vehicle 10, a radar device, or a lidar device.

The storage device 18 includes a random access memory (RAM) or a read-only memory (ROM), and is configured to store information that is used when the vehicle 10 drives. The storage device 18 is configured to store a program that is used to execute the operation of the vehicle control device 13.

In a case where the arithmetic control device 14 has determined that the road surface situation or the vehicle situation has changed with respect to the predetermined threshold, the vehicle behavior control device 15 changes a safety related behavior of the vehicle 10. Here, the threshold for the road surface situation is a change in the slope of a road 26 illustrated in FIGS. 4A to 4C that occurs over time or distance. The threshold for the vehicle situation is, for example, the ground contact state of a front wheel 27 with respect to the road 26, such as whether the front wheel 27 is slipping, which will be described with reference to, for example, FIG. 5.

The vehicle operation device 20 is configured to receive an operation performed by the driver 21 driving the vehicle 10 to steer the vehicle 10 and control the car speed. In one example, the vehicle operation device 20 has an accelerator pedal and a brake pedal, which are not illustrated herein, and a steering wheel.

The image capture device 23 is, for example, a front view monitor disposed at the front end portion (for example, a front grille or its vicinity) of the vehicle 10, and captures images of blind spots that cannot be seen by the driver 21, who is sitting in the driver's seat, such as a range including an area below the front end portion of the vehicle 10. Furthermore, the image capture device 23 may also be an image sensor configured to capture images of wheels of the vehicle 10, such as an image of a front wheel and its vicinity.

The vehicle condition detection device 24 is configured to detect a road surface situation of the road where the vehicle 10 is driving or a vehicle situation that is a situation of the vehicle 10 itself while the vehicle 10 is driving. The vehicle condition detection device 24 includes, as one example, either one of or both of a slope angle detection sensor 241 and a ground contact detection sensor 242.

The slope angle detection sensor 241 is a sensor configured to detect the slope angle of the road where the vehicle 10 is driving. In one example, as the slope angle detection sensor 241, an accelerometer built in a map locator, an accelerometer used in an anti-lock braking system (ABS) or Vehicle Dynamics Control (VDC), or an accelerometer for collision type detection may be used.

The ground contact detection sensor 242 is a sensor configured to detect a situation of the tires of the vehicle 10 that are in contact with the road 26, which will be described later. An example of the situation is a situation in which the vehicle 10 is slipping. The ground contact detection sensor 242 determines whether slipping is present from rotational speed or torque of the tires. As the ground contact detection sensor 242, a wheel speed sensor configured to detect the rotational speed of the wheels can be used.

The vehicle safety control device 25 is a device configured to control safety related behaviors of the vehicle 10 and is, for example, a device configured to execute adaptive cruise control (ACC). Furthermore, the vehicle safety control device 25 also serves as an engine control device.

The display device 17 is a display device disposed at, for example, a dashboard or its vicinity in the vehicle compartment of the vehicle and including a liquid crystal panel. The display device 17 is configured to display information related to driving of the vehicle 10 and to notify the driver 21 of the information.

The vehicle control device 13 includes the arithmetic control device 14, the storage device 18, the vehicle behavior control device 15, the vehicle operation device 20, the image capture device 23, the vehicle condition detection device 24, the vehicle safety control device 25, and the display device 17 among the constituent devices described above.

Figure 2:
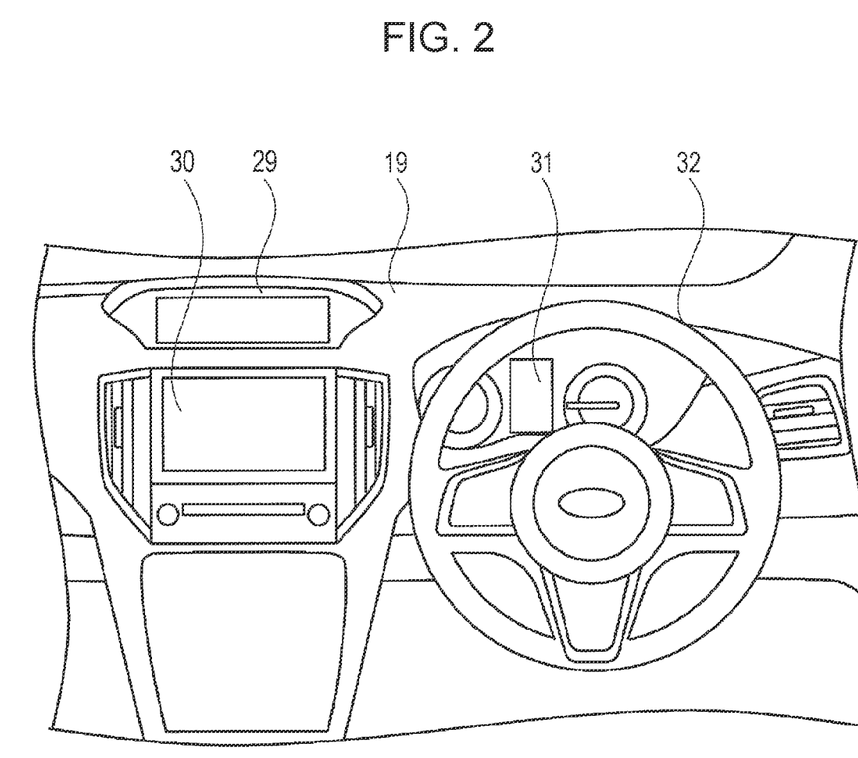
FIG. 2 is a diagram illustrating the configuration of a display device in the vehicle provided with the vehicle control device according to the embodiment of the disclosure.

FIG. 2 is a diagram illustrating individual displays provided at a dashboard 19 of the vehicle 10.

The dashboard 19 is provided with, as the display device 17 illustrated in FIG. 1, a multifunction display 29, a center display 30, and a multi-information display 31. The multifunction display 29 is disposed at the center of the dashboard 19 in the width direction and toward the top end of the dashboard 19. The center display 30 is disposed at the center of the dashboard 19 in the width direction and below the multifunction display 29. The multi-information display 31 is disposed behind a steering wheel 32.

In the present embodiment, in a case where it is determined that the road surface situation or the vehicle situation has changed by a predetermined amount or more, display is performed to change a safety related behavior of the vehicle 10 as in the following description. The display is performed using the multifunction display 29, the center display 30, or the multi-information display 31 serving as the display device 17.

Figure 3:
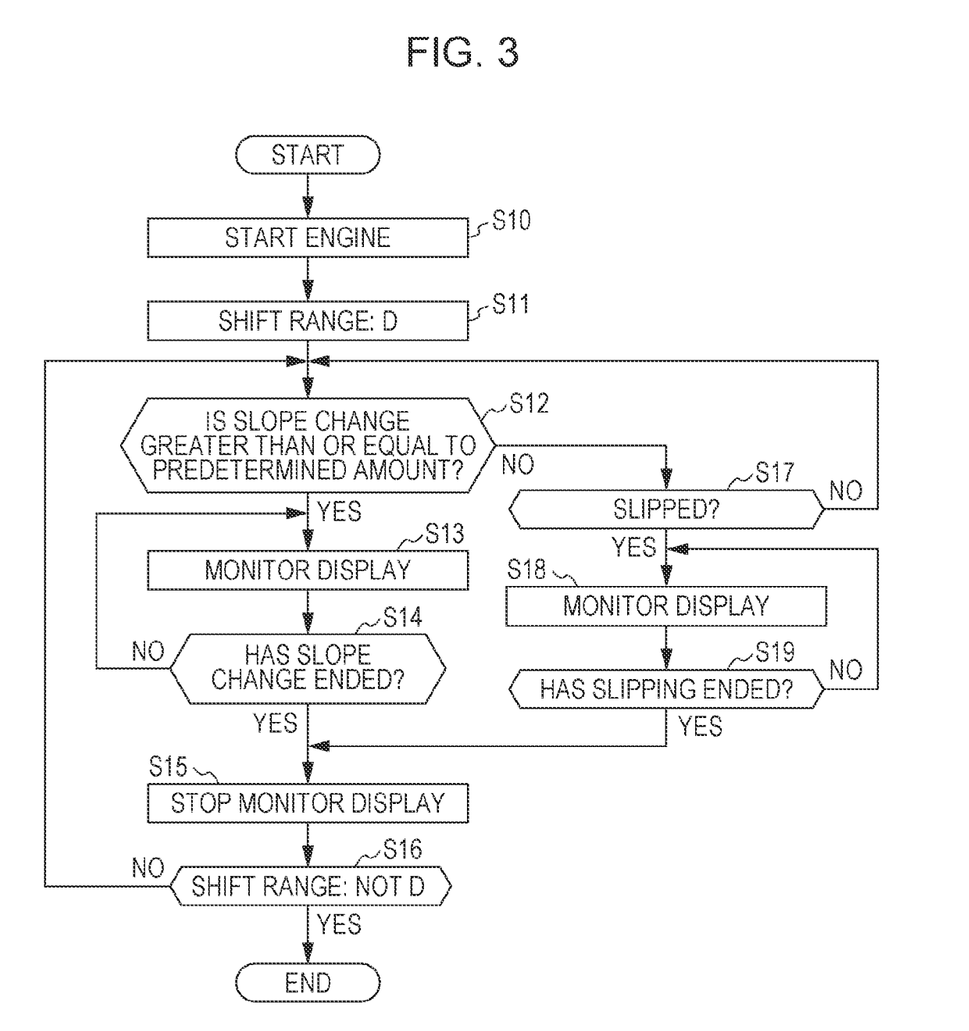
FIG. 3 is a flowchart illustrating the operation of the vehicle control device according to the embodiment of the disclosure.

FIG. 3 is a flowchart illustrating the operation of the vehicle control device 13. With reference to FIG. 3, the operation of the vehicle control device 13 described above will be described.

In step S10, the arithmetic control device 14 starts the vehicle drive device 16, an example of which is an engine.

In step S11, the driver 21 changes the shift range from parking (P) to, for example, drive (D) to cause the vehicle 10 to drive. Thereafter, the vehicle 10 drives in fully autonomous driving mode, semi-autonomous driving mode, or a non-autonomous driving mode on the basis of a command from the driver 21 or the arithmetic control device 14.

In step S12, the arithmetic control device 14 determines whether a change in the road surface situation of the road 26 where the vehicle 10 is driving, such as a change in the slope of the road surface, over a predetermined distance or a predetermined time is greater than or equal to a predetermined amount. In one example, the arithmetic control device 14 determines whether a change in slope angle over a predetermined distance or a predetermined time exceeds a preset threshold.

Figure 4A:
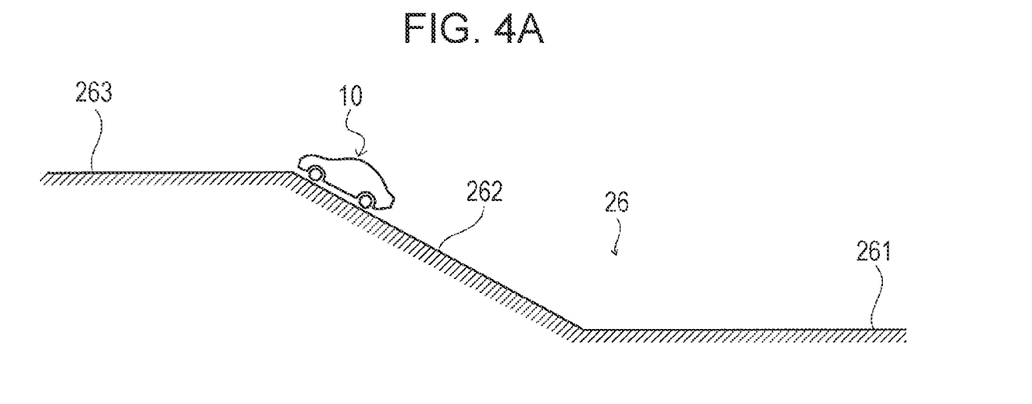
FIGS. 4A, 4B, and 4C are diagrams illustrating the vehicle control device according to the embodiment of the disclosure and are schematic diagrams illustrating a situation in which the vehicle provided with the vehicle control device is driving on a road that has a slope.
Figure 4B:
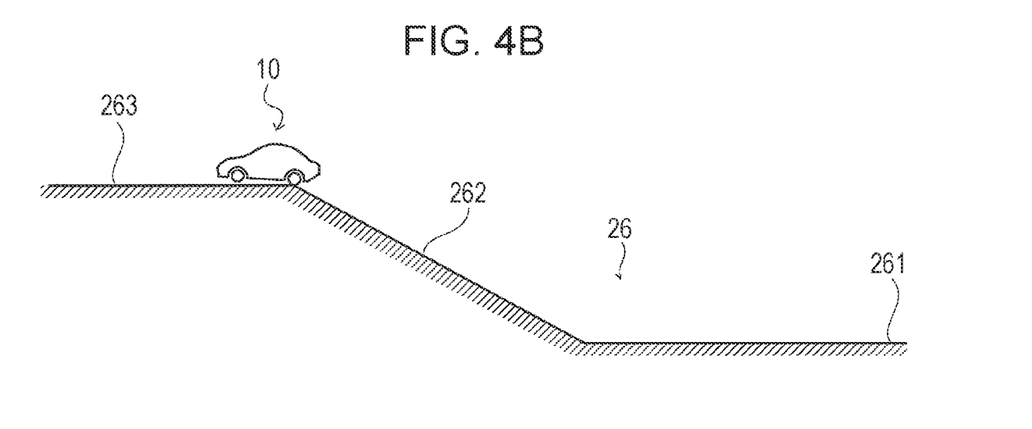
Figure 4C:
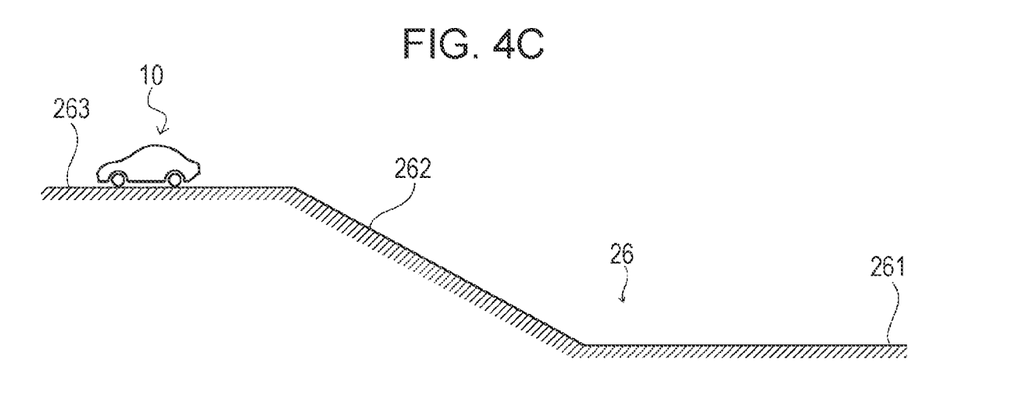

Step S12 will be described in detail with reference to FIGS. 4A to 4C. FIGS. 4A, 4B, and 4C are schematic diagrams illustrating a situation in which the vehicle 10 provided with the vehicle control device 13 is driving on the road 26 that has a slope. The slope angle detection sensor 241 detects the slope angle of the road 26 where the vehicle 10 is driving. The arithmetic control device 14 determines whether a change in the slope of the road 26 is greater than or equal to a predetermined amount on the basis of a change in input from the slope angle detection sensor 241.

In FIG. 4A, the vehicle 10 is driving on the road 26. The road 26 has a flat road 261, a sloped road 262, and a flat road 263 from right on the sheet of the drawing. Here, a case will be described in which the vehicle drive device 16 is about to reach the boundary between the sloped road 262 and the flat road 263.

The slope angle of the road 26 greatly changes when the vehicle 10 comes to the end of the sloped road 262. For example, the slope angle of the sloped road 262 is 10 degrees, and that of the flat road 263 is 0 degrees. Thus, the slope angle of the road 26 decreases by 10 degrees at the boundary connecting the sloped road 262 with the flat road 263.

When the vehicle 10 comes to the end of the sloped road 262, it is difficult for the driver 21 driving the vehicle 10 to grasp the situation of the flat road 263. Thus, in a case where there is an obstruction or the like on the flat road 263, it is assumed that it may not be easy to avoid the obstruction. In the present embodiment, even when the driver 21 does not perform an operation, the safety at or beyond the boundary connecting the sloped road 262 with the flat road 263 is improved by displaying a captured image of an area ahead of the vehicle 10 on the display device 17, which will be described below. In this case, the image includes a moving image and a still image.

When YES in step S12, that is, in a case where the amount of change in the slope of the road 26 has changed and exceeded a predetermined threshold, the process proceeds to step S13. Here, the predetermined threshold is a change in road surface slope that is at such a level that the driver 21 sitting in the vehicle 10 does not have a clear view of the flat road 263 ahead (the rate of change in road surface slope within an observable distance is greater than or equal to the predetermined threshold). The predetermined threshold is set on the basis of the height of the vehicle 10 or the average viewpoint height of drivers 21.

When NO in step S12, that is, when a change in the slope of the road 26 is less than a predetermined amount, such as in a case where the amount of change in the slope of the road 26 has not exceeded the predetermined threshold, the process proceeds to step S17.

In step S13, the vehicle behavior control device 15 performs monitor display as an example of control to improve safety on the basis of a command from the arithmetic control device 14. In one example, on the basis of a command from the arithmetic control device 14, the image capture device 23 at the front of the vehicle 10 captures an image of the flat road 263, and the display device 17 displays the image captured by the image capture device 23. As a result of this, the driver 21 can grasp the situation of the flat road 263 ahead of the vehicle 10 by using the display device 17 without performing any operation. Thus, in a case where there is an obstruction on the flat road 263, the driver 21 can avoid the obstruction by controlling the steering wheel or the brake. Furthermore, since the situation of the flat road 263 ahead of the vehicle 10 is displayed on the display device 17, the driver 21 can concentrate on driving.

In step S14, the arithmetic control device 14 determines whether the slope change of the road 26 has ended. In one example, when a change in slope angle input from the slope angle detection sensor 241 is less than a predetermined amount, the arithmetic control device 14 determines that the slope change of the road 26 has ended.

When YES in step S14, that is, in a case where the slope change of the road 26 has ended, the process proceeds to step S15 immediately or after a predetermined time has elapsed.

In step S15, the image captured by the image capture device 23 is not displayed on the display device 17. That is, the display status of the display device 17 returns to that in or before step S12 even when there is not a command to end display from the driver 21.

When NO in step S14, that is, in a case where the slope change of the road 26 continues, the process returns to step S13 and the arithmetic control device 14 continues monitor display in step S13.

In step S16, the driver 21 changes the shift range to something other than drive (D), an example of which is parking (P), to stop the vehicle 10. As a result, the vehicle 10 ends driving.

In step S17, the arithmetic control device 14 determines whether the vehicle situation of the vehicle 10 has changed with respect to a predetermined threshold, such as whether the vehicle 10 is slipping.

Figure 5:
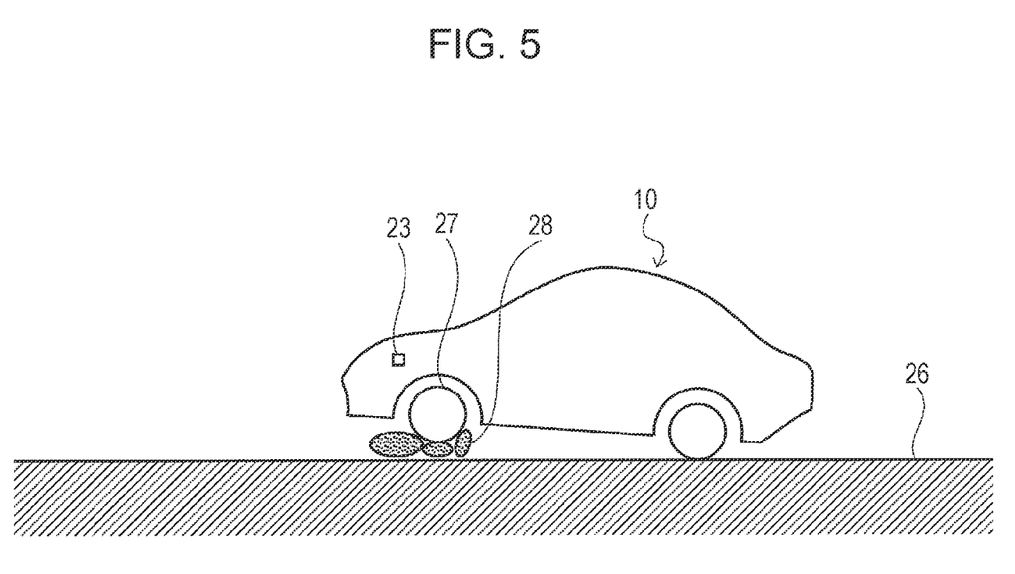
FIG. 5 is a diagram illustrating the vehicle control device according to the embodiment of the disclosure and is a schematic diagram illustrating a situation in which the vehicle provided with the vehicle control device is driving on a road where there are stones.

FIG. 5 is a schematic diagram illustrating a situation in which the vehicle 10 provided with the vehicle control device 13 is driving on the road 26 where there are stones 28.

In a case where there are many stones 28 on the road 26, when the front wheel 27 of the vehicle 10 runs over the stones 28, the front wheel 27 may slip. In the present embodiment, the ground contact detection sensor 242 is configured to detect slipping of the front wheel 27. The ground contact detection sensor 242 is configured to be able to detect that the front wheel 27 is slipping in a case where the amount of rotation of the front wheel 27 is smaller than those of the other wheels. Alternatively, the ground contact detection sensor 242 is configured to be able to detect that the front wheel 27 is slipping in a case where the torque of the front wheel 27 is lower than a predetermined value. Furthermore, the ground contact detection sensor 242 is configured to be able to detect that the front wheel 27 is slipping, on the basis of both of the amount of rotation and the torque of the front wheel 27.

When YES in step S17, that is, when the front wheel 27 is slipping, the process proceeds to step S18.

When NO in step S17, that is, when the front wheel 27 is not slipping, the process returns to step S12.

In step S18, on the basis of a command from the arithmetic control device 14, the vehicle behavior control device 15 performs monitor display as an example of control to cause the vehicle safety control device 25 to improve safety. In one example, with reference to FIG. 5, an image of the front wheel 27 and the stones 28 present near the front wheel 27 is captured using the image capture device 23 disposed near the front wheel 27 of the vehicle 10 on the basis of a command from the arithmetic control device 14. Even in a state in which a command is not input by the driver 21, the image captured by the image capture device 23 is displayed on the display device 17 on the basis of a command from the arithmetic control device 14. As a result of this, the driver 21 can recognize that the front wheel 27 is slipping because of the stones 28, and thus can concentrate on driving without any worries. Furthermore, since the driver 21 can predict the travel path of the front wheel 27, a side wall cut of the front wheel 27 can be avoided.

In step S19, the arithmetic control device 14 determines whether slipping of the front wheel 27 has ended. The ground contact detection sensor 242 is configured to be able to detect that the front wheel 27 is not slipping in a case where the amount of rotation of the front wheel 27 is equivalent to those of the other wheels. Alternatively, the ground contact detection sensor 242 is configured to be able to detect that the front wheel 27 is not slipping in a case where the torque of the front wheel 27 is greater than or equal to a predetermined value. Furthermore, the ground contact detection sensor 242 is configured to be able to detect that the front wheel 27 is not slipping, on the basis of both of the amount of rotation and the torque of the front wheel 27.

When YES in step S19, that is, in a case where slipping of the front wheel 27 has ended, the process proceeds to step S15, and the arithmetic control device 14 stops displaying the image immediately or after a predetermined time has elapsed even when the driver 21 does not input a command to end display, the image being captured by the image capture device 23.

When NO in step S19, that is, in a case where slipping of the front wheel 27 has not ended, the process returns to step S18 and the arithmetic control device 14 continues monitor display in step S18.

From the embodiment described above, main effects as in the following can be obtained.

With the vehicle control device 13 according to the embodiment of the disclosure, a safety related behavior of the vehicle 10 is changed in a case where it is determined that the road surface situation or the vehicle situation has changed by a predetermined amount or more. Thus, even when a person sitting in the vehicle 10 does not perform any operation in accordance with the road surface situation or the vehicle situation, safety can be improved while the vehicle 10 is driving.

Furthermore, with the vehicle control device 13, in a case where a change in slope angle measured by the vehicle condition detection device 24 is determined to be greater than or equal to the predetermined amount, an image of an area ahead of the vehicle 10 is displayed on the display device 17, the image being captured by the image capture device 23. As a result of this, even when there is a change in the slope angle of the road surface, a person sitting in the vehicle 10 can accurately grasp the road surface situation ahead of the vehicle 10, and driving can be performed safely.

Furthermore, with the vehicle control device 13, in a case where it is determined that a road surface contact state has changed with respect to a predetermined threshold, that is, a wheel is slipping, an image of the wheel and its vicinity captured by the image capture device 23 is displayed on the display device 17. As a result of this, the driver 21 can accurately grasp the cause of the slipping or the road surface situation of the vicinity of the wheel.

Furthermore, with the vehicle control device 13, in a case where it is determined that the road surface situation or the vehicle situation has changed by a predetermined amount or more, the vehicle behavior control device 15 is caused to perform control to improve safety. Thus, driving with increased safety can be achieved in accordance with the road surface situation or the vehicle situation.

In the above, embodiments of the disclosure have been described; however, the disclosure is not limited to these embodiments, and changes can be made without departing from the gist of the disclosure. Moreover, some or all of the embodiments described above can be combined.

For example, in the embodiments described above, the vehicle behavior control device 15 performs monitor display as an example of control to improve safety; however, other control may be performed as control to improve safety. For example, when a change in the slope of the road 26 or slipping of the front wheel 27 is detected, the vehicle behavior control device 15 terminates ACC as control to perform driver-passenger protection control, so that safety can be improved while the vehicle 10 is driving. Furthermore, when determining that wheel slipping is likely to occur due to the road surface situation, the arithmetic control device 14 may perform, as control to improve safety, control so as to reduce engine revolutions per minute (RPM) and change the driving mode to a mode in which slipping is less likely to occur.

Furthermore, with reference to FIGS. 4A to 4C, in the embodiments described above, when the vehicle 10 driving on the sloped road 262, which is an upward slope, is about to drive onto the flat road 263, a captured image of an area ahead of the vehicle 10 is displayed on the display device 17. However, in a case where the vehicle 10 driving on a flat road is about to drive onto a downward slope, a captured image of an area ahead of the vehicle 10 may also be displayed on the display device 17.

Furthermore, in step S11 and the like of FIG. 3, an automatic transmission is described as an example of the transmission of the vehicle 10; however, a manual transmission may be used as the transmission of the vehicle 10. In a case where a manual transmission is used as the transmission of the vehicle 10, control substantially the same as that performed by the automatic transmission can be performed in accordance with the state of the shift range or parking brake in step S11 and the like illustrated in FIG. 3.

Moreover, in step S17 and the like of FIG. 3, the vehicle safety control device 25 performs control in a state in which the shift range is D, that is, drive; however, regardless of what the shift range is, in a case where the position of the vehicle is changing in a state in which the tires are not rotating, the vehicle condition detection device 24 determines that the vehicle is sliding down, and the vehicle safety control device 25 may perform control.

Furthermore, in FIG. 2, the multifunction display 29, the center display 30, and the multi-information display 31 are illustrated as an example of the display device 17; however, other display devices may be used as the display device 17. For example, a digital mirror or the like can be used as the display device 17.

The arithmetic control device 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of arithmetic control device 14 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the arithmetic control device 14 illustrated in FIG. 1.

The invention claimed is:

1. A vehicle control device for a vehicle comprising:
   an accelerometer configured to detect a slope angle of a road surface on which the vehicle is driving;
   a ground contact detection sensor configured to detect a ground contact state between a wheel of the vehicle and a road surface;
   a first image capture device configured to capture a first real-time image of an area ahead of the vehicle;
   a second image capture device configured to capture a second real-time image of the wheel;
   a display device disposed in a vehicle compartment of the vehicle; and
   an arithmetic control device configured to:
   perform a first determination process to determine whether a change in the slope angle over a predetermined time is greater than or equal to a predetermined value;
   in response to determining, in the first determination process, that the change in the slope angle over the predetermined time is greater than or equal to the predetermined value, (1) control the display device to display the first real-time image and (2) perform a second determination process to determine whether the change in the slope angle over the predetermined time is less than the predetermined value;
   in response to determining, in the second determination process, that the change in the slope angle over the predetermined time is less than the predetermined value, (1) control the display device to not display the first real-time image and (2) repeat performance of the first determination process;
   in response to determining, in the second determination process, that the change in the slope angle over the predetermined time is not less than the predetermined value, (1) control the display device to maintain displaying the first real-time image and (2) repeat performance of the second determination process;
   in response to determining, in the first determination process, that the change in the slope angle over the predetermined time is not greater than or equal to the predetermined value, perform a third determination process to determine whether the wheel is slipping based on the ground contact;
   in response to determining that the wheel is not slipping in the third determination process, repeat performance of the first determination process;
   in response to determining that the wheel is slipping in the third determination process, (1) control the display device to display the second real-time image and (2) perform a fourth determination process to determine whether the wheel is not slipping;
   in response to determining that the wheel is not slipping in the fourth determination, (1) control the display device to not display the second real-time image and (2) repeat performance of the first determination process; and
   in response to determining that the wheel is slipping in the fourth determination, (1) control the display device to maintain displaying the second real-time image and (2) repeat performance of the fourth determination process.

* * * * *